Patented Aug. 20, 1929.

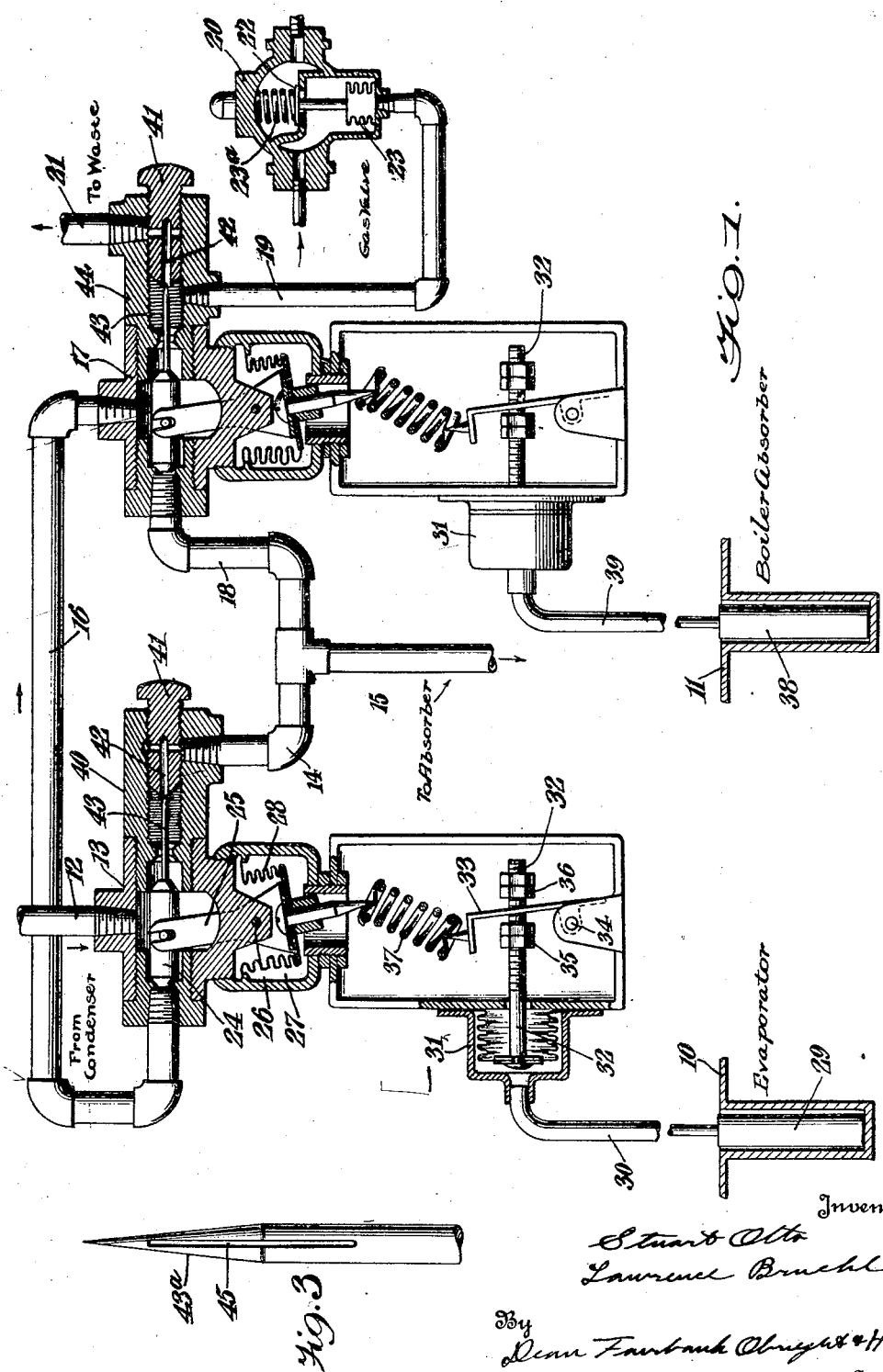

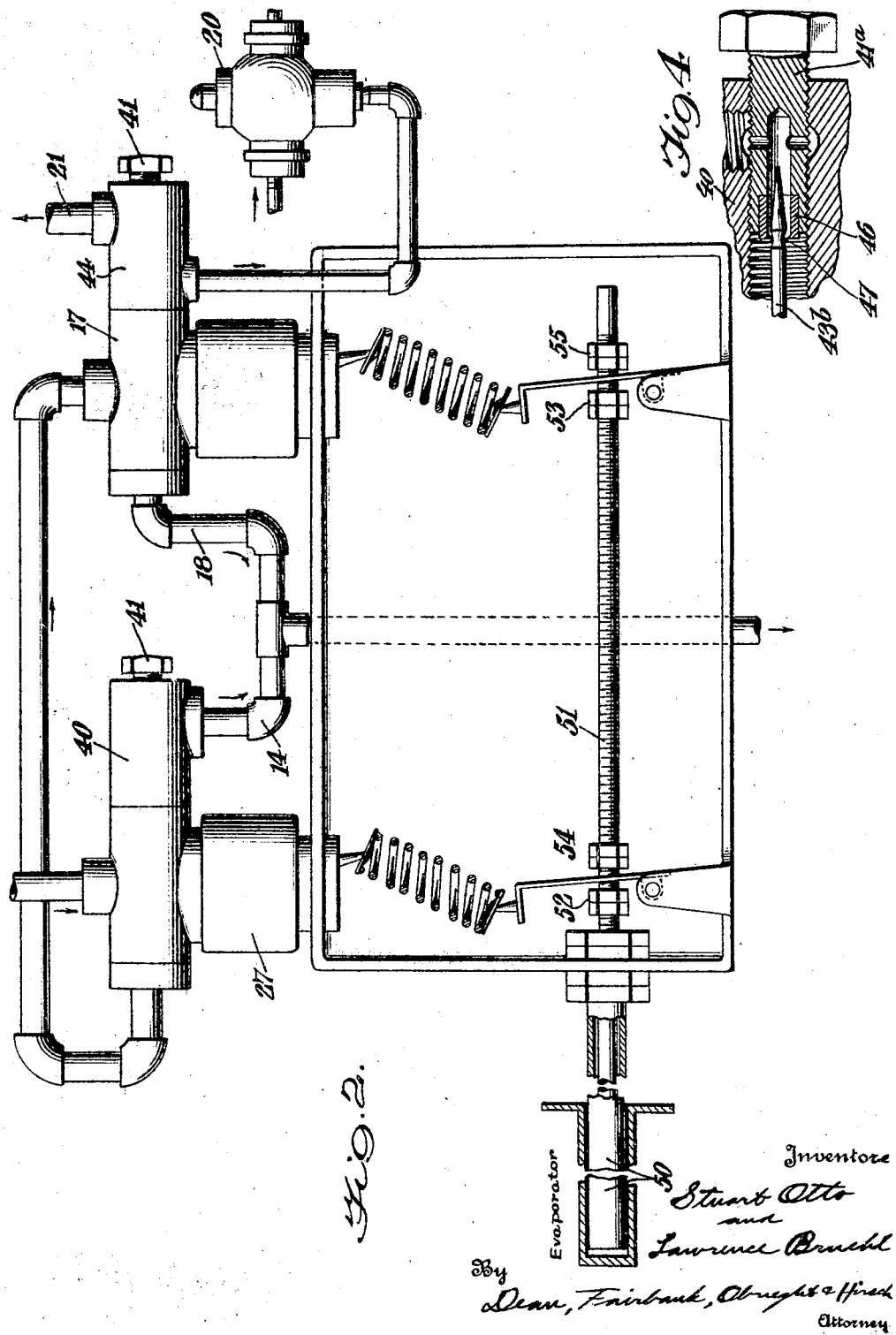

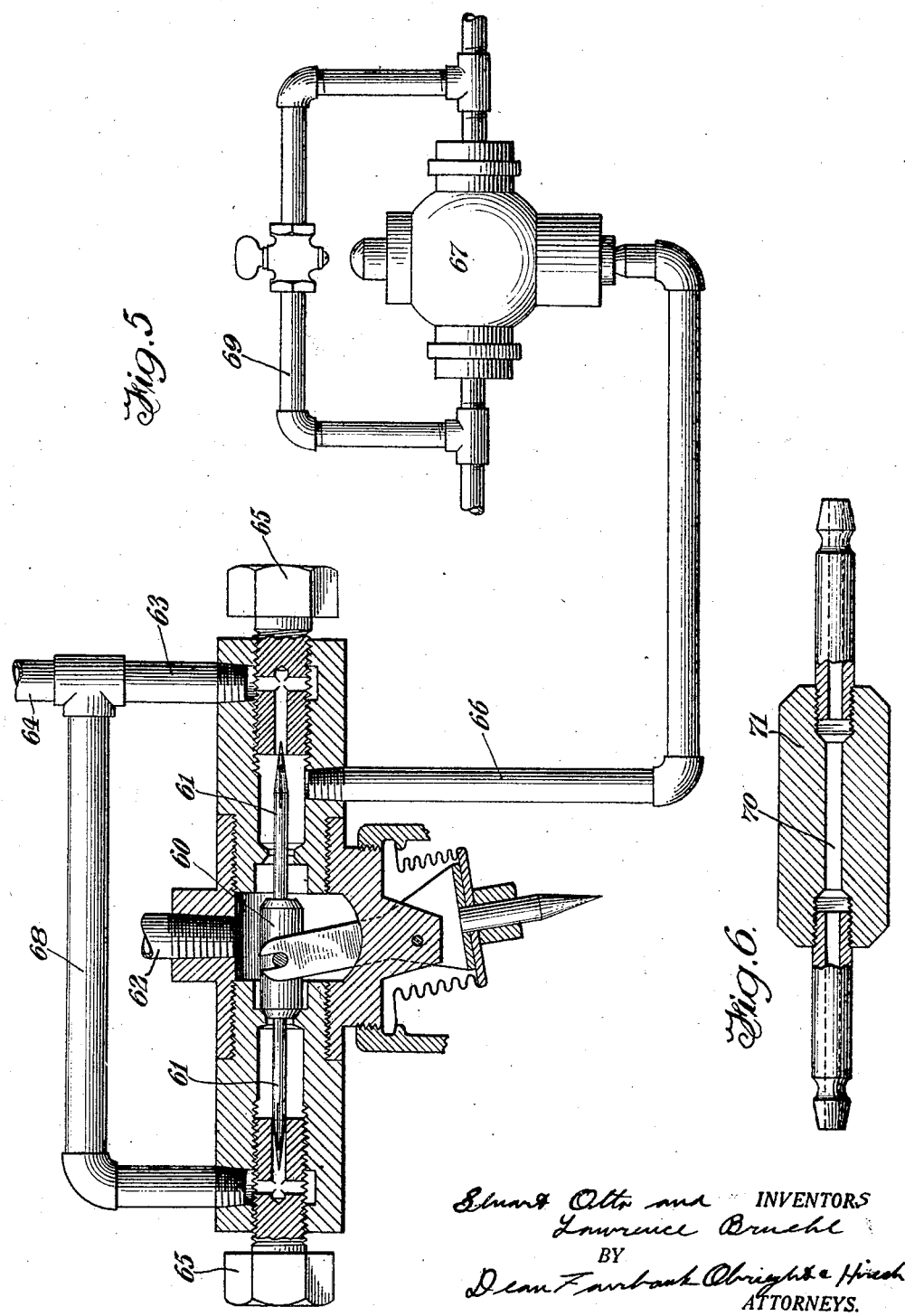

1,725,205

UNITED STATES PATENT OFFICE.

STUART OTTO, OF WILTON, CONNECTICUT, AND LAWRENCE BRUEHL, OF BROOKLYN, NEW YORK, ASSIGNORS TO GAS REFRIGERATION CORPORATION, OF SCRANTON, PENNSYLVANIA, A CORPORATION OF DELAWARE.

AUTOMATIC CONTROL OF ABSORPTION-REFRIGERATING APPARATUS.

Application filed February 11, 1927. Serial No. 167,423.

In refrigerating apparatus of the intermittently operating absorption type, the boiler-absorber is alternately heated and cooled. During the heating period the refrigerant gas is driven off, liquefied in the condenser, and delivered to a receiver or the evaporator. During the cooling of the boiler-absorber, the liquefied refrigerant evaporates in the evaporator and is returned to the absorbent liquid in the boiler-absorber. The cycle of operations is controlled and the change from one phase to another is timed by turning on and off the heating and cooling mediums.

The main object of our present invention is to provide means for automatically controlling the flow of cooling water and heating gas to the boiler-absorber. As the cooling water is ordinarily delivered under the pressure of street mains or high head, we utilize the water pressure as the force for opening the valve which controls the flow of heating medium to the boiler-absorber. Inasmuch as the boiler-absorber may be heated either by liquid or gaseous fuel or electric current, the term "valve" is used in its broad sense to include not only the ordinary gas or liquid fuel valves, but a switch serving as a controller for the flow of electric current to the heating element.

In our improved construction the arrangement is such that the mechanical actuation of the water valves controls not only the application of the cooling agent to the boiler-absorber, but also controls the application of the heating agent thereto.

As one important feature we provide means whereby the flow of water through the boiler-absorber is comparatively rapid for a short interval immediately after the end of the heating period to quickly start the absorbing period, and is very much slower during the balance of the absorbing period while the low temperature is being maintained.

As another feature there is provided means whereby the restriction providing the minimum water flow is automatically freed of any obstructions during each shifting of the water valve.

As another important feature there are provided a pair of water valves so connected that they are shifted at different times by different operating conditions in the system, and permit the full or the limited flow, or prevent flow of water to the absorber. At the same time they control the application of the water pressure to the valve controlling the heating medium.

As a further important feature there are provided fluid containing power elements, one subjected to evaporator temperature for operating one of the water valves, and the other subject to boiler-absorber temperature conditions for operating the other water valve. Various other advantages, important features and objects of our invention will be pointed out hereinafter or will be apparent from a consideration of the constructions illustrated.

In the accompanying drawings:

Fig. 1 is a view partly in section and partly in elevation of a construction embodying our invention.

Fig. 2 is a view similar to Fig. 1, but employing a single power element for operating both water valves, Figs. 3 and 4 are details showing alternative forms of the needle valve.

Fig. 5 is a view similar to a portion of Fig. 1, but showing an apparatus designed for a continuously operating system, and Fig. 6 is a view showing an alternative form of valve for use in the construction shown in Fig. 5.

The apparatus illustrated is adapted for use in a refrigerating system of the intermittently acting boiler-absorber type. The complete system is not illustrated, but such system may be of the general character shown in the Otto & Jankus patent 1,582,882, issued April 27th, 1926.

The system includes an evaporator 10 and a boiler-absorber 11. Water under pressure is delivered to the condenser and from the latter through the pipe 12 to a first three-way valve 13. With this in one position the water may flow through pipes 14 and 15 to the boiler-absorber to cool the latter. When the valve is in the opposite position the water may flow through the pipe 16 to a second three-way valve 17. With this second valve in one position water may flow through the pipe 18 to the pipe 15, and thence to the absorber, while when in the opposite position it may flow through the pipe 19 to the gas valve 20, and to the waste pipe 21. The gas valve is shown as having gas inlet and outlet pipes and a valve member 22 connected to a bellows, diaphragm, piston, or other actuating means 23. The valve 20 is for controlling the application of the heating medium to the boiler-absorber. Such heating means is delivered when there is water pressure in the pipe 19 and is shut off when said water pressure drops below a predetermined limit. For closing the valve when the water pressure drops, there may be provided a spring 23ª. It will be noted that the element 22 might be an electric switch for opening and closing the flow of current, instead of a poppet for opening and closing the flow of gas.

The two water valves are similar in construction. Each is illustrated as including a plunger member 24 having its opposite ends serving as the valve portions, and adapted to seat alternately against oppositely disposed water outlet ports. The valve member is provided with means for holding it in either of its two limiting positions and shifting it from one position to the other when a particular temperature condition is reached in the corresponding part of the apparatus. As illustrated there is provided a valve lever 25 having a pivotal center 26 and a fork at one end for engaging a pin or projection on the valve member. The lever projects into a chamber 27 and is there connected to the end wall of a bellows 28 which forms a liquid-tight partition sub-dividing the chamber into two compartments. One of these includes the pivotal support of the lever and is in open communication with the source of water pressure. The other side of the partition or bellows may open directly to the atmosphere.

In the evaporator 10 or subject to the temperature of the latter or the chamber to be cooled there is provided a power element 29 which may be a cell or container with an expansible fluid such as is employed in connection with various forms of thermostatically controlled apparatus. This power element is connected by a conduit 30 to a bellows or diaphragm chamber 31 which may be similar to the chamber 27. The diaphragm or bellows on its opposite side is connected to a rod 32 which is free to reciprocate and the position of which is dependent upon the temperature in the evaporator. Any suitable means may be employed for shifting the valve 24, preferably with a snap action upon the desired movement of the rod 32. Merely as an example there is illustrated a lever 33 mounted on a pivot 34 and engaging with the rod 32 between a pair of spaced, independently adjustable nuts 35, 36. The free end of the lever 33 is directed toward the outside end of the lever 25 and between the two there is a coil spring 37. With the two parts in the position illustrated the spring presses the lower end of the lever 25 toward the right and holds the valve in its limiting left hand position to close the inlet of the pipe 16. If the fluid in cell 29 expands to force the rod 32 toward the right a sufficient distance, it will cause the lever 33 to move the lower end of the spring 37 to the right to such distance that it will pass beyond the end of the lever 25, and beyond dead center. The spring will then shift the valve to the opposite limiting position and hold it against its other seat.

The valve 17 is substantially identical with the valve 13 and is operated by similar mechanism although the actuation is effected by a power element 38 mounted in or subject to the temperature of the boiler-absorber and operating through a pipe 39 to the bellows or diaphragm chamber 31.

As will be apparent from the later description of the operation, it is desired that there be a rapid flow of water to the absorber when said flow is through the pipe 18, and a slower flow when the pipe 14 is opened. For accomplishing this purpose there is provided a restriction in the passage leading to the pipe 14. Such a restriction may become clogged by the action of impurities in the water or by corrosion, and thus the operation may be interfered with. We provide a construction whereby the size of the restriction may be readily adjusted and the passages automatically cleaned each time the main valve is shifted. As illustrated, the casing of the valve 13 is provided with an auxiliary casing 40, at one end of which is one of the two valve seats for the valve 24. Within the casing 40 is a plug 41 having a passage 42 providing the maximum slow flow to the absorber. The valve 24 has a loosely fitting needle 43 which may reciprocate within the passage 42 but which does not act to close the latter. By adjusting the plug 41 to the position illustrated, the needle is entirely free of the end of the passage when the valve 24 is in the position shown, and thus there may be the desired free but restricted flow through the passage 42. The end of the needle or plunger 43 is conical so that by adjusting the plug 41 toward the left, the needle will be brought into position so that the flow may be reduced to the desired extent and in accordance with the operating conditions in the absorber and in the evaporator. When the valve 24 is shifted to engage its right hand seat and prevent flow of water into the casing 40, the needle will enter the passage 42 for substantially the full stroke of the plunger, and will act to clear said passage of any obstructions such as scale, dirt particles, or the like, which might, if permitted to accumulate, interfere with the desired rate of slow or restricted flow to the absorber.

In connection with the valve 17 it is desired to maintain a full water pressure to the valve 20 when the valve 17 is open, and at the same time to permit a restricted flow to waste. It is also desired to maintain the passage to the waste open when the valve 17 is closed. The valve casing 44 is similar to the valve casing 40, except that it has an opening for the pipe 19 at a point in advance of the restriction. Thus when the valve is open, full water pressure may be exerted through the pipe 19 to open the valve 20, and at the same time a small amount of water may flow past the restriction to the pipe 21.

In Fig. 3 there is shown on a very much larger scale a form of needle adapted for use with the valve 17. The adjustment of the plug 41 in respect to the conical end portion 43$^a$ regulates the restricted flow. The body of the needle may be of substantially the same size as the passage, and the leakage to relieve pressure so that gas valve may close is along a slot 45.

In Fig. 4 a further form of needle valve is illustrated. Here the plug 41$^a$ has a collar or sleeve 46 which is contracted at its outer end, and the needle 43$^b$ has an annular groove 47. By adjusting the plug axially the contracted part of the collar may be brought opposite any desired part of the conical end so as to control the size of the restriction. When the valve 17 is closed at the right end, the needle will be substantially in the position shown in Fig. 4. The water pressure exerted in the pipe 19 and on the bellows 23 may rapidly drop by flow of water through the groove 47. The size of the groove may be such that the passage to waste is increased when the needle moves into the position shown which is not the case with the slot 45.

The operation of the control is as follows. The parts are illustrated in the position which they occupy during the main portion of the absorption period. The cooling water flows through the condenser to the pipe 12, and thence from the right hand end of the valve 13 through the passage 42 and pipes 14 and 15 to the absorber. The cooling in the evaporator is dependent at least in part, upon the rate at which the refrigerant gas is absorbed in the absorber, and this rate of absorption is dependent primarily upon the extent to which the absorbent is cooled. Thus, by adjusting the plug 41 the cooling effect in the evaporator may be at any desired rate. It will be noted that with the parts in this position no water flows through the pipe 16 to the valve 17, and the bellows 23 is opened to the waste so that there is no water pressure acting on the valve element 22 to hold it open. The spring holds it in closed position, and therefore there can be no heating of the boiler-absorber.

When the evaporator becomes nearly empty, evaporation slows down and the temperature of part of the evaporator goes up. This causes expansion of the fluid in the power element 29, and a movement of the rod 32 toward the right. The nut 35 is adjusted to such point that when the evaporator temperature reaches a certain predetermined point, the lever 33 will swing past dead center and the spring 37 will shift the valve member 24 to the opposite position and prevent flow through the pipe 14. This temperature may be varied according to the wishes of the manufacturer or user. Merely for example this may be set for 31° F.

As soon as the left hand valve in 13 shifts to permit the flow of water to the right hand valve in 17, it will be noted that no water can flow to the absorber. The full water pressure will be exerted through pipe 19 to open the valve 20, and the heating of the boiler-absorber will begin. The plug 41 of this right hand valve 17 is so adjusted that there will be maintained the desired back pressure on the diaphragm or bellows 23 to hold the valve 20 open, but at the same time there may be a restricted flow through the pipe 21 at such rate as will give the proper cooling action in the condenser during the heating of the boiler-absorber.

This operation will continue until substantially all of the refrigerant gas has been driven out from the boiler. The boiler temperature continues to rise during the boiling period, and thus the fluid in the power element 39 continues to expand and move the rod 32 thereof toward the right. When most of the refrigerant has been driven off from the absorbent and has been liquefied in the condenser, the temperature in the boiler-absorber will reach such a point that fluid in the cell 38 of the right hand valve will cause the corresponding rod 32 to move the lever 33 past dead center and shift the right hand valve 24. This shuts off the supply of water pressure to the valve 20 and the pressure at said valve will relieve itself through the waste pipe, and the valve 20 will close. At the same time the flow of water to the pipe 18 will be opened up. The heating of the boiler-absorber thus stops and at the same time there is a large volumn flow of water through the unrestricted pipe 18 to rapidly cool the absorber down from its high temperature. The rapid cooling of the absorber causes a rapid evaporation of liquid in the evaporator and the temperature which during the heating period has risen considerably above 31° F., will cool down to a temperature below that point. When this desired minimum temperature of say 26° F. is reached the nut 36 on the left hand rod 32 will pull the lever 33 back to the position shown in Fig. 1, stopping the flow of water through the pipe 16. At the same time it will open the restricted flow of water through the pipe 14 and the evaporation in the evaporator will now go on at a slower rate once the temperature has been brought down to the desired minimum. During this stage the position of the right hand valve is not controlling on the operation, as no water would flow through the pipe 16. The operation continues until the temperature of the boiler-absorber gets down to a predetermined limit and the fluid in the power element 38 contracts and the right hand valve moves back to the position shown in Fig. 1 ready for turning on the heating medium when the left hand valve 13 is again shifted at the end of the next cooling and absorbing period.

It will be noted that the left hand valve 13 is controlled solely by the temperature in the evaporator, and the right hand valve 17 solely by the temperature in the boiler-absorber. The parts are so proportioned and the nuts on the rods 32 are so positioned, that the shifting of the valves will take place in the order above specified, and the particular temperature for each valve shift may be varied by adjusting the nuts.

It will be noted that the operation is entirely automatic and fool-proof. The valve for the heating medium is automatically shut off when the temperature of the boiler reaches a desired high limit, so that there is no danger of overheating the boiler. In case the supply of cooling water should fail during the heating period, so that there would not be the proper cooling in the condenser, the reduced water pressure would permit the bellows 23 to collapse and shut off the heating medium. If for any other reason there is insufficient cooling in the condenser and the temperature in the boiler absorber should rise, the valve for the heating medium will immediately close. If the water supply be shut off for any length of time, both the evaporator and the boiler-absorber will rise in temperature. This rise in temperature in the evaporator will shift the left hand valve toward the right, but such rise in temperature will not be sufficient even if continued up to room temperature, to shift the right hand valve toward the right. Therefore whenever the water supply is again turned on it will immediately flow through the pipe 16 to the right hand valve and open the gas valve 20 to start the heating period and restore the system to normal operation. The user may shut down the whole apparatus at any time and in any stage of its cycle by merely closing off the supply of cooling water. Whenever it is desired to start operation again, it is merely necessary to turn on the water. The apparatus automatically shifts to such position that it is ready to begin the heating period after a shut-down.

Although in the foregoing description it is stated that the pipe 12 leads from the condenser, it will be obvious that the condenser may be inserted at some other point in the circuit. The control would operate the same if the condenser were in the waste line, assuming, of course, that the cooling water from the absorber also goes to the waste line in advance of the point where the latter would deliver to the condenser. The condenser could be in the pipe 16. The placing of the condenser in the pipe line 12 has the advantage of providing a continuous flow of water through the condenser and thus there is less liability of dirt or sediment settling in the water space of the condenser to clog the passages.

In Fig. 2 there is illustrated a control apparatus similar to that shown in Fig. 1, except that both of the valves are operated from a single power element. The details of the valves are not illustrated, but it will be understood that they may be substantially the same as shown in Fig. 1. In this construction there is shown a thermostatical power element 50 composed of an outer steel tube and an inner copper rod 51 and mounted in the evaporator or in heat interchanging relationship thereto, so as the temperature in the evaporator rises the rod 51 will be moved toward the right. The parts are shown in the position which they occupy at the end of the absorption period when the evaporator starts to rise in temperature. When the liquid refrigerant in the evaporator is nearly all evaporated the temperature will begin to rise and the rod 52 will move toward the right. The movement of the rod operates the valves in the following manner:

When the evaporator temperature reaches a predetermined point the stop 52 will shift the left hand valve so as to send water to the right hand valve and open the valve for the heating medium. The evaporator temperature will continue to rise because now there will be no further evaporation of the refrigerant therein and there will be heat leak to the evaporator and possible condensation of the refrigerant. When this temperature reaches a further predetermined limit the rod 51 will have been moved to such a point that the stop 53 will shift the right hand valve and this will stop the heating action and send a rapid flow of cooling water to the absorber. This valve shifting action does not take place until the evaporator has been warmed to the maximum extent and that will not be until after the heat has been on the boiler for the required length of time. The cooling of the evaporator following the shifting of the right hand valve moves the power element 51 toward the left. Due to the differences in lost motion, it first shifts the left hand valve by the action of a stop 54 and sends the minimum flow of water to the absorber and thereafter shifts the right hand valve by the stop 55 to be ready for the next gas flow, but the gas is not turned on by this shifting. The four stops 52, 53, 54 and 55 may be adjusted to vary the position and extent of each lost motion so as to give any desired operation at any desired temperature. Although the construction shown in Fig. 1 has certain advantages over that shown in Fig. 2, still the latter is simpler and less expensive in that it has only a single power element.

In Fig. 5, there is shown a construction adapted for a continuously operating system as distinct from an intermittently operating one. The valve member 60 is substantially the same as the valve 24 shown in Fig. 4 except that it has needles 61 upon opposite ends thereof so that there may be regulated but restricted flow from either end of the valve. It is thought that a detailed description of the construction is not necessary. Water from the condenser enters through the pipe 62, and with the parts in the position illustrated, may have a maximum flow through the pipe 63 to the waste pipe 64. This maximum flow may be regulated by adjusting the plug 65. The high water pressure may act through the pipe 66 to open the valve 67. When the power element in the evaporator shifts the valve 60, the water pressure at the valve 67 may drop and there will be a restricted flow of water through the pipe 68 to the pipe 64. The absorber and condenser may be inserted in the pipe 64 or 62. There is a by-pass 69 around the gas valve 67 so as to permit limited flow when the gas valve is closed.

In this construction the apparatus acts merely to increase or decrease the heating action at the boiler and the cooling action at the absorber. When the demand on the evaporator is small the apparatus may run indefinitely with the minimum flow of both cooling water and heating medium. When the demands on the evaporator increase so that the temperature in the evaporator rises, the control apparatus will turn on more heat to the boiler and more water to the condenser and absorber.

In the construction shown in Fig. 5, the two pipes 63 and 68 lead from opposite ends of the valve block. This is not necessary as there may be employed such a valve member as that shown in Fig. 6. In this construction there is a passage 70 lengthwise of the valve member 71. When the valve is in the left hand position, the device will operate the same as it is in Fig. 5. When shifted to the right hand position, the liquid which may flow along the left hand needle or extension may flow back lengthwise through the valve member to the pipe 65 instead of out through a separate pipe such as 68. In each of the forms illustrated the valves are 3 way valves of the reciprocating type. Other types of 3 way valves might be used and in some cases two separate 2 way valves in place of each 3 way valve.

Having thus described our invention, what we claim as new and desire to secure by Letters Patent is:

1. A refrigerating apparatus of the absorption type, including a boiler-absorber, an evaporator, a pair of three-way cooling water valves, one outlet from one of said valves leading to the inlet of the other, and one outlet from each of the valves leading to the absorber, one of said last mentioned outlets providing restricted flow and the other providing free flow of the cooling water.

2. A refrigerating apparatus of the absorption type, including a boiler-absorber, an evaporator, a pair of three-way cooling water valves each having an inlet, an unrestricted outlet, and a restricted outlet, connections between the unrestricted outlet of one valve and the inlet of the other, and means for delivering water from the restricted outlet of the first mentioned valve and the unrestricted outlet of the second mentioned valve to the absorber.

3. A refrigerating apparatus of the absorption type, including a boiler-absorber, an evaporator, a pair of three-way cooling water valves each having an inlet, an unrestricted outlet, and a restricted outlet, connections between the unrestricted outlet of one valve and the inlet of the other, and means for delivering water from the restricted outlet of the first mentioned valve and the unrestricted outlet of the second mentioned valve to the absorber, and means for supplying heating medium to the apparatus when the restricted outlet of the second mentioned valve is open.

4. A refrigerating apparatus of the absorption type, including a boiler-absorber, an evaporator, a pair of three-way cooling water valves each having an inlet, an unrestricted outlet, and a restricted outlet, connections between the unrestricted outlet of one valve and the inlet of the other, means for delivering water from the restricted outlet of the first mentioned valve and the unrestricted outlet of the second mentioned valve to the absorber, and thermostatically operated means for shifting said valve.

5. A refrigerating appartus of the absorption type, including a boiler-absorber, an evaporator a pair of three-way cooling water valves each having an inlet, an unrestricted outlet and a restricted outlet, connections between the unrestricted outlet of one valve and the inlet of the other, and means for delivering water from the restricted outlet of the first mentioned valve and the unrestricted outlet of the second mentioned valve to the absorber, means for shifting one of said valves in accordance with the temperatures of said evaporator, and means for shifting the other of said valves in accordance with the temperature of said boiler-absorber.

6. A refrigerating apparatus of the absorption type including a boiler-absorber, an evaporator, a three-way cooling water valve having a pair of opposed valve seats, a reciprocatory member for engagement with either of said seats, means for conducting water from one of said seats to the boiler-absorber, a member beyond the other of said seats and having a restricted passage therethrough, and an extension on said reciprocatory member adapted to enter said passage, a valve for controlling the flow of heating medium to the apparatus, and means for opening said valve including a flexible diaphragm and a conduit leading to said three-way valve intermediate of said last mentioned valve seat and said passage member.

7. A refrigerating apparatus of the absorption type including a pair of water valves connected in series, a thermostatically operating element in thermal relationship to the evaporator for operating one of said valves, a thermostatically operating element in thermal relationship to the boiler for operating the other valve, and means for conducting a restricted flow of water from the first of the valves to the absorber or a free flow through the two valves in series to the absorber.

8. The method of controlling a refrigerating apparatus of the absorption type, including delivering cooling water at a rapid rate to the absorber at the beginning of the absorption period and at a lower rate when the evaporator cools below a predetermined temperature.

9. The method of controlling a refrigerating apparatus of the absorption type, including delivering cooling water to the absorber at a restricted rate during the main absorption period, shutting off the supply of water and applying heat to the boiler when the temperature in the evaporator exceeds a predetermined limit and shutting off the supply of heating medium to the boiler when the temperature in the boiler exceeds a predetermined limit.

10. A refrigerating apparatus of the absorption type, including a boiler-absorber, an evaporator, a cooling water circulating system, a pair of three-way valves in series in the water circulating system, a thermostatic element in the evaporator for operating one valve, and a thermostatic element in the boiler-absorber for operating the other valve.

11. A refrigerating apparatus of the absorption type, having a boiler-absorber, an evaporator, a cooling water circulating system, a heating medium supply, a pair of independently operating three-way valves in the cooling water system, separate thermostatically operating means for controlling said valves to give different rates of water flow therefrom to said boiler-absorber and water operated means controlled by one of said valves for controlling said heating supply means.

12. A refrigerating apparatus of the absorption type, having a boiler-absorber, an evaporator, a cooling water circulating system, a heating medium supply, a pair of independently operating three-way valves in the cooling water system, thermostatically operating means operating in accordance with the temperature in the evaporator for controlling one of said valves, thermostatically operating means operating in accordance with the temperature in the boiler-absorber for controlling the other of said valves, and water operated means controlled by one of said valves for controlling said heating supply means.

13. The process of controlling the operation of an intermittently operating refrigerating apparatus of the absorption type which includes the steps of supplying water at a low rate to the absorber when the temperature in the evaporator is below a predetermined limit, supplying heating medium to the boiler-absorber when the temperature in the evaporator goes above said limit, shutting off the supply of heating medium when the temperature in the boiler-absorber reaches a predetermined limit, and at the same time supplying cooling water at a rapid rate to the boiler-absorber and restricting the flow of water to the boiler-absorber when the temperature in the evaporator gets down to a predetermined limit.

14. The method of controlling a refrigerating apparatus of the intermittently operating absorption type, including delivering cooling water to the boiler-absorber at a rapid rate at the beginning of the absorption period and at a slower rate when the evaporator cools to a predetermined temperature, shutting off the supply of water to the boiler-absorber and applying heat thereto when the temperature in the evaporator exceeds a predetermined limit, and shutting off the supply of heat when the temperature in the boiler-absorber exceeds a predetermined limit.

Signed at New York in the county of New York and State of New York this 9th day of February, 1927.

STUART OTTO.
LAWRENCE BRUEHL.